Figure 1:
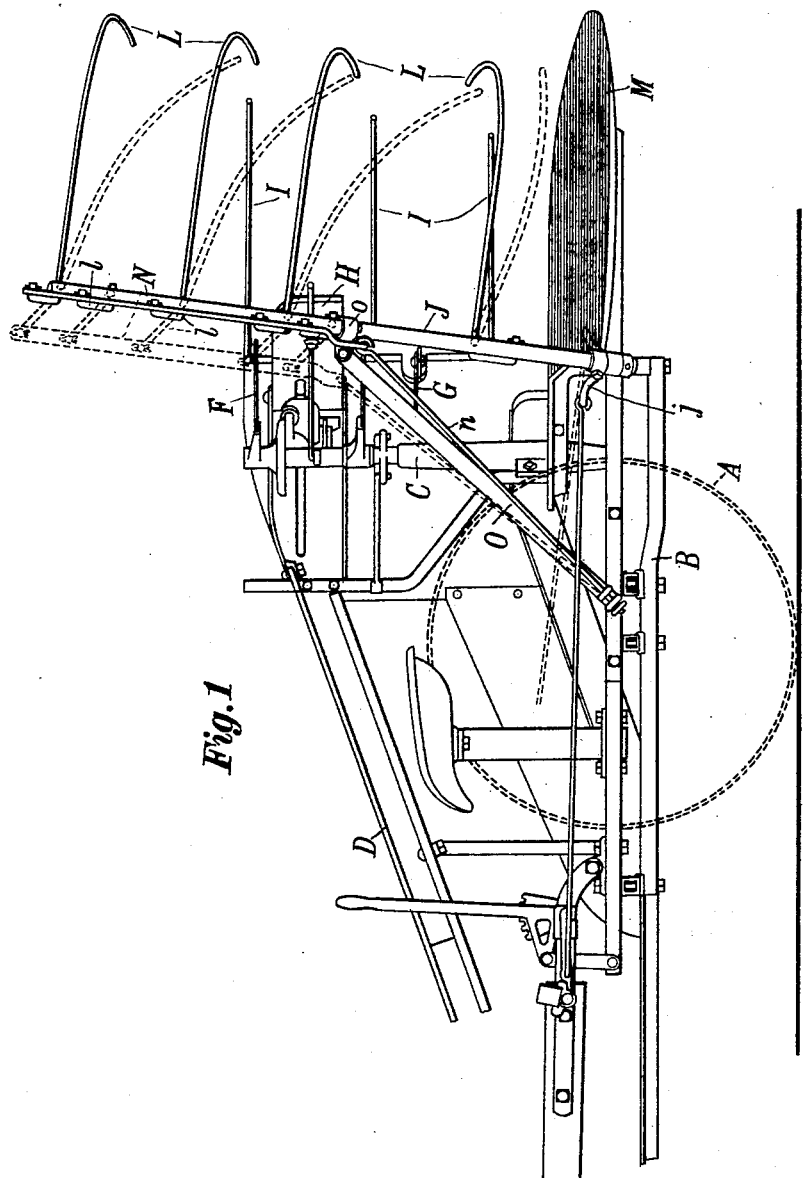

(No Model.)

2 Sheets—Sheet 1.

J. W. PRIDMORE.
BUNDLE CARRIER FOR CORN HARVESTERS.

No. 588,008. Patented Aug. 10, 1897.

WITNESSES:
John M. Culver.
Wm H Ferguson

INVENTOR
John W Pridmore
R. B. Swift
ATTORNEY.

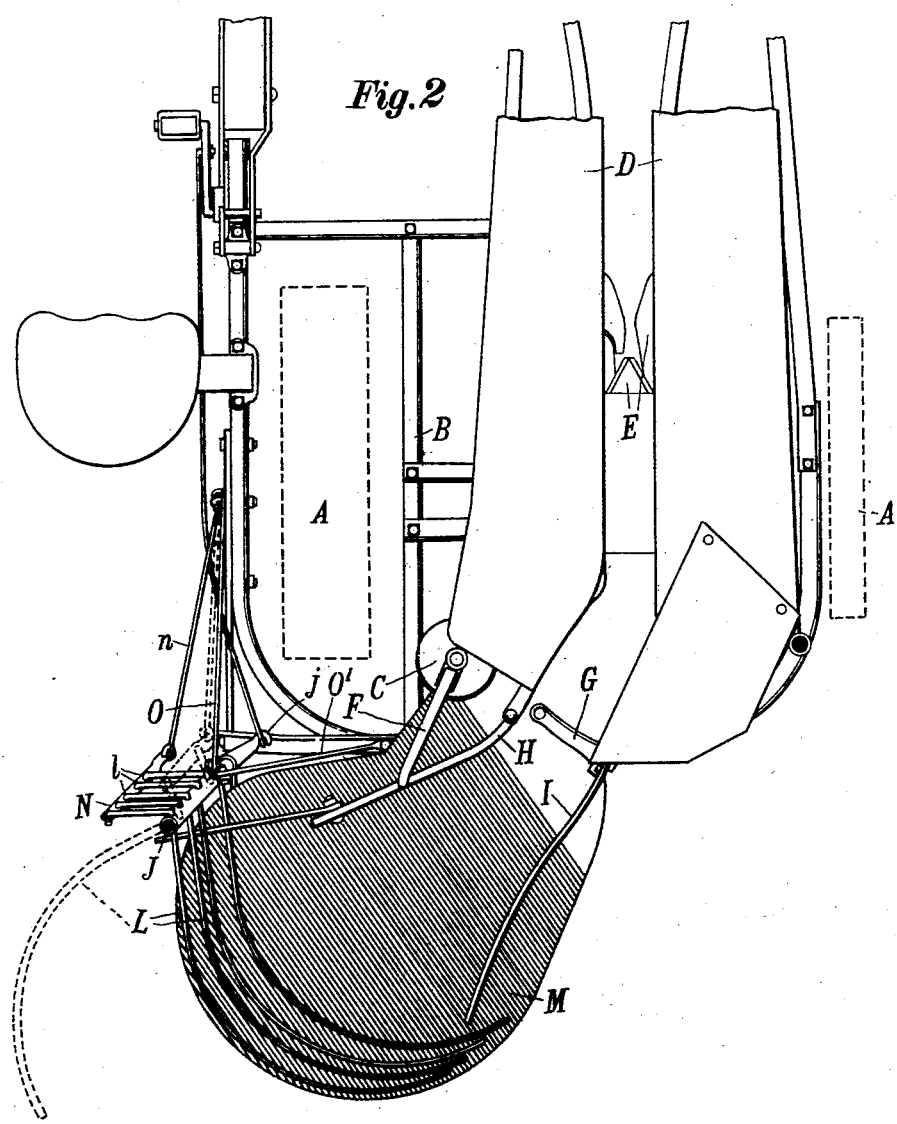

UNITED STATES PATENT OFFICE.

JOHN W. PRIDMORE, OF CHICAGO, ILLINOIS, ASSIGNOR TO THE McCORMICK HARVESTING MACHINE COMPANY.

BUNDLE-CARRIER FOR CORN-HARVESTERS.

SPECIFICATION forming part of Letters Patent No. 588,008, dated August 10, 1897.

Application filed March 5, 1897. Serial No. 626,097. (No model.)

*To all whom it may concern:*

Be it known that I, JOHN W. PRIDMORE, a citizen of the United States, residing at Chicago, in the county of Cook and State of Illinois, have invented certain new and useful Improvements in Bundle-Carriers for Corn-Harvesters, of which the following is a specification.

My invention relates to improvements in bundle-carriers for corn-binders, in which the bundles of corn are bound while standing vertically and are discharged from the machine to one side into a bundle-carrier that receives them in nearly an upright position and holds them until a load has accumulated, when they are dropped in a pile in windrows for convenience in shocking; and the objects of my improvement are, first, to provide a carrier that shall be so positioned upon the machine as not to greatly increase the width of the machine and thus prevent the machine being driven through the corn-fields; second, to provide a carrier that will retain the bundles and when operated by the driver will quickly discharge its load; third, to provide a carrier that shall be easily operated and be a practical device when put into the hands of ordinary users. I attain these objects by mechanisms illustrated in the accompanying drawings, in which—

Figure 1 is a side view of my bundle-carrier, attached to so much of a vertical corn-binding machine as is necessary to show the construction of my improvement. In dotted lines the teeth are shown in the position that they occupy when the load is being dumped; and Fig. 2 is a top view of the same parts, showing more clearly the bottom board that supports the butts of the carrier and the guides that conduct the bundles thereto.

Similar letters refer to similar parts in both views.

The wheels A are shown in dotted lines and unattached to the framework B of the corn-harvester, but it is to be understood that they are attached to the frame and are provided with gearing to operate the devices that gather the corn and bind it and deliver the bundles into the bundle-carrier. The binder C is positioned on end at the rear of the gathering devices and receives the on-coming stream of stalks that are gathered between the prongs D and severed by the knife E. When sufficient of these stalks have accumulated to form a bundle, they are encircled with a band and discharged by the rotating discharge-arms F. The trip-arm G is thrown out of the path of the discharge of the bundle, which is guided on the side next to the discharge-arms by the stripper-board H and on the other side by the guiding-rods I.

My improvement in bundle-carriers consists of a main supporting-pipe J, that is pivoted to the main frame B of the harvester at the outer rear corner of the frame. This pipe J is provided with a crank extension $j$, from which a connecting-rod is extended to a foot-lever pivoted to the main frame B of the harvester at a point convenient to be operated by the foot of the driver. The supporting-pipe J stands somewhat inclined to the vertical binder, so that when the bundle is discharged from the binder it will be sufficiently inclined so that there will be no tendency for the bundles to be jolted or blown back upon the binder. A cradle is formed to receive the bundles by pivoting the fingers L in the bar J and extending them rearwardly and inwardly, so that they will catch the bundles as they are discharged from the binder. Beneath the fingers the binder deck or floor M drops somewhat from the plane upon which the bundle is bound, so that when the bundle is discharged it may have a more easy exit, and this floor is continued, so as to form a support for the bundles as they rest in the cradle formed by fingers L. As before remarked, fingers L are pivoted in the supporting-pipe J, and they are controlled on their pivots by crank extensions $l$, which are connected by a bar N, and this bar is in turn connected to a fixed part of the machine by the connecting-rod $n$. The attachment of the end of the connecting-rod $n$ to the machine is at a point inwardly toward the machine and downwardly from the attachment of the rod to the connecting-bar N. The lower finger of the cradle is in the drawings shown to be fastened rigidly in the supporting-pipe J. It has been found by practical experience in the field that this finger will shed the heavy butts of the bundles without any motion of the finger itself and that when rigidly fixed in the pipe it does not tend to catch in the stubble, as it would were it pivoted and given the same motion as the upper fingers.

The supporting-pipe J is braced by the brace O, which extends forwardly from the collar $o$ to the machine-frame B, and a brace O', which extends practically at right angles to this brace inwardly and is attached to the rear sill of the frame B.

In the operation of the machine the bundles are accumulated and bound and discharged as in machines of the Peck type. As they are thrown out of the binder the guiding-rods and stripper-board conduct them into the cradle of the bundle-carrier, the deflected reach in the bottom allowing the butts to slide out more easily. When sufficient bundles have accumulated to form a load, the operator works the foot-lever, and the bundle-carrier fingers swing outwardly on the center formed by the supporting-pipe. As they move outwardly their crank extensions are swung inwardly, and the connecting-rod $n$ raises them, it being located in such a position as to raise these cranks when they are swung inwardly, and the outer ends of the fingers are thus caused to drop, allowing the accumulated load to slide from them. However light the tops of the corn may be and however tangled and straggly they may have been formed into the bundle the double movement of the fingers will shed the load.

Attention is called to another feature in the discharge of the load by this carrier, and that is to the manner in which the accumulated bundles, partly supported as they are in the carrier, follow the outward sidewise motion of the carrier as it swings outwardly, thus causing the bundles to fall farther from the machine than they otherwise would. In machines of the type of corn-harvesters where the corn can be moved but slightly sidewise owing to the difficulty of the machine giving sufficient traction to transport the corn any very great distance it is an important feature to discharge the bundle as far to the side as possible in order that it may be out of the path of the horses in the next round of the machine.

Having now described my invention, what I claim, and desire to secure by Letters Patent, is—

1. In combination in a self-binding harvester with a binder positioned on end, an upright post positioned to the frame of the harvester, connections from this post extending convenient to the driver for revolving the post on its pivot, curved fingers pivoted in the post and means for revolving these fingers on their pivots when the post is actuated to discharge a load of bundles.

2. In combination in a corn-harvesting machine with devices to gather, cut, bind and discharge bundles while retaining the corn in an upright position, a bundle-carrier positioned upon the machine to receive the bundles as they are discharged, the carrier consisting of an upright post pivoted at its lower end to the frame of the machine, and its upper end supported from the machine by braces, a crank on the post, a connecting-rod upon the crank extending convenient to the driver, curved fingers pivoted in the post, having cranked extensions, a bar connecting these extensions and a connecting-rod extending from the bar to a fixed portion of the machine, substantially as and for the purpose specified.

3. In combination to form a bundle-carrier for a vertical self-binding corn-harvester, an upright post pivoted to the harvester, means for revolving this post on its pivot, a cradle formed by fingers attached to the post, guides for conducting the bundles into the cradle formed by the fingers, and a bottom to support the bundles in the cradle, positioned in a lower plane than that upon which the bundles were bound.

4. In combination to form a bundle-carrier for a vertical self-binding harvester, an upright post pivoted at its lower end to the frame of the harvester, braces to support its upper end, a crank fixed on the post and connections therewith to revolve the post on its pivot, a cradle formed of curved fingers, pivoted in the upper end of the post and fixed in the lower end, a bar connecting the crank extensions of the upper fingers, a connecting-rod uniting this bar and a fixed part of the machine, at a point beneath and inwardly toward the machine from the normal position of the bar when the carrier is in position to receive bundles, guides to conduct the bundles as discharged by the binder into the cradle formed by the fingers, a fixed platform to support the bundles in the carrier, formed by extending the table upon which the bundles are bound outwardly and bending it downwardly, all substantially as and for the purpose specified.

JOHN W. PRIDMORE.

Witnesses:
T. D. BACH,
F. A. ERICSSON.